（12） United States Patent
Sambhy et al.

(10) Patent No.: US 11,840,646 B2
(45) Date of Patent: Dec. 12, 2023

(54) PRINTED SURFACES WITH ANTIMICROBIAL PROPERTIES

(71) Applicant: XEROX CORPORATION, Norwalk, CT (US)

(72) Inventors: Varun Sambhy, Pittsford, NY (US); Eliud Robles Flores, Webster, NY (US); Douglas A. Gutberlet, Ontario, NY (US); Paul F. Sawicki, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 43 days.

(21) Appl. No.: 17/454,194

(22) Filed: Nov. 9, 2021

(65) Prior Publication Data

US 2023/0147464 A1 May 11, 2023

(51) Int. Cl.
*C09J 11/04* (2006.01)
*C09J 7/40* (2018.01)
*C09J 7/22* (2018.01)
*C09J 7/21* (2018.01)

(52) U.S. Cl.
CPC ............. *C09J 11/04* (2013.01); *C09J 7/21* (2018.01); *C09J 7/22* (2018.01); *C09J 7/403* (2018.01); *C09J 2301/41* (2020.08); *Y10T 428/14* (2015.01)

(58) Field of Classification Search
CPC ....... C09J 11/04; C09J 7/21; C09J 7/22; C09J 7/403; C09J 2301/41; Y10T 428/14
See application file for complete search history.

(56) References Cited

U.S. PATENT DOCUMENTS

| 5,527,658 A | 6/1996 | Hopper et al. |
| 7,476,698 B2 | 1/2009 | Wagener et al. |
| 9,247,736 B2 | 2/2016 | Ylitalo et al. |
| 10,007,200 B2 | 6/2018 | Farrugia et al. |
| 2004/0247653 A1 | 12/2004 | Gabbay |

(Continued)

FOREIGN PATENT DOCUMENTS

| CN | 103814332 A | * | 5/2014 | ............... G03G 8/00 |
| WO | 2005/015319 A1 | | 2/2005 | |

OTHER PUBLICATIONS

Machine Translation of CN-103814332-A. (Year: 2014).*

*Primary Examiner* — Patricia L. Nordmeyer
(74) *Attorney, Agent, or Firm* — MH2 Technology Law Group LLP

(57) ABSTRACT

A printable antimicrobial medium is disclosed, including a substrate layer having a first surface which may include a first area, a second surface opposite the first surface which may include a second area. The printable antimicrobial medium also includes a first adhesive deposited on the first area, a liner layer releasably secured to the substrate layer by the first adhesive, and a first antimicrobial dry marking material deposited on at least a portion of the second area of the substrate layer. The printable antimicrobial medium may include a first score line arranged to separate one or more layers of the printable antimicrobial medium into a first portion and a second portion, and an antimicrobial dry marking material may include copper oxide deposited on at least a portion of the second area of the substrate layer.

19 Claims, 2 Drawing Sheets

(56) References Cited

U.S. PATENT DOCUMENTS

2012/0308754 A1* 12/2012 Dehlinger ........... A61F 13/0269
428/41.8
2020/0139739 A1 5/2020 Robles Flores et al.
2020/0142341 A1 5/2020 Robles Flores et al.

* cited by examiner

PRINTED SURFACES WITH ANTIMICROBIAL PROPERTIES

FIELD OF THE DISCLOSURE

This disclosure relates generally to printed antibacterial or antimicrobial surfaces, and more specifically to printed antibacterial or antimicrobial coatings for application to high-touch surfaces.

BACKGROUND

The recent COVID-19 pandemic has emphasized a fresh and urgent focus on development of antimicrobial technologies that may prevent or slow disease transmission to populations. Disease transmission from touching contaminated surfaces is a potential avenue by which variety of diseases, including COVID-19, may spread. High-touch surfaces, or surfaces that may be touched frequently by many people are especially risky and may lead to disease spread in settings likes hospitals, schools, offices, libraries, public transport, and the like. Specific examples of high-touch surfaces include door handles and handrails, hospital and school furniture, keyboards, pin pads, common use devices, appliances, and the like. The inhibition of bacterial contamination on inanimate surfaces including high-touch surfaces such as doorknobs, bed or stair rails, touch screen monitors, cell phones may be desirable as well. With the current rise in infections and widespread antibiotic resistance, new coatings for these high-touch surfaces, especially in healthcare-associated environments such as hospitals, medical clinics or dental offices is highly advantageous. There is also a continuing problem related to bacterial and fungal contamination through contact with surfaces and objects also within airplanes and cruise ships. Individuals suffering from gastroenteritis, for example, can easily spread the illness by touching handrails, shared utensils, elevator buttons, etc. In some cases, contamination can be deadly especially in the cases of outbreaks of gastroenteritis acquired on cruise ships caused by Noroviruses or food poisoning due to particular strains of *Escherichia coli* and *Salmonella*. Another bacterium, *Staphylococcus aureus*, is a major culprit for many illnesses and skin irritations. There is a type of *Staphylococcus aureus* that is Methicillin-resistant (known as MRSA) which is resistant to the antibiotic methicillin and other drugs in this class. This need for fabricating or modifying high-touch surfaces, such that they are antimicrobial or antibacterial is expected to grow significantly as the current pandemic progresses and leaves a lasting transformation in consumer and public behavior towards disease prevention.

Therefore, a need exists for providing antibacterial or antiviral surfaces or a method of modifying a high-touch surface that can include antimicrobial or antiviral agents to enhance antimicrobial or antibacterial activity of a high-touch surface. The ability to provide variable areas of antimicrobial or antibacterial functionality directly onto inanimate surfaces may result in cost savings and other advantages. Furthermore, the ability to print as needed instead of using traditional fabrication methods would also save considerable time and cost, since digital planning and printing may provide improved speed and applicability of antibacterial or antimicrobial protection for high-touch surfaces.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A printable antimicrobial medium is disclosed. The printable antimicrobial medium includes a substrate layer which may include a first surface having a first area, a second surface opposite the first surface including a second area, and a first rigidity. The printable antimicrobial medium also includes a first adhesive deposited on the first area. The printable antimicrobial medium also includes a liner layer releasably secured to the substrate layer by the first adhesive, and a first antimicrobial dry marking material deposited on at least a portion of the second area of the substrate layer.

The printable antimicrobial medium may also include where the first antimicrobial dry marking material includes a toner. The printable antimicrobial medium may include an antimicrobial additive. The antimicrobial additive is present in an amount ranging from about 0.01% to about 5.00%, based on a total weight of the first antimicrobial dry marking material. The first antimicrobial dry marking material may include copper oxide. The first antimicrobial dry marking material may include copper nanoparticles. The first antimicrobial dry marking material may include silver nanoparticles, silver salts, or mixtures thereof. The first antimicrobial dry marking material deposited on at least a portion of the second area of the substrate layer may include a variable image content. The substrate layer further may include paper. The substrate layer further may include plastic. The substrate layer further may include a vinyl-based material. The liner layer further may include a first score line arranged to separate the liner layer into a first portion and a second portion. The printable antimicrobial medium may include a second score line arranged to separate the printable antimicrobial medium into a first portion and a second portion.

Another printable antimicrobial medium is disclosed. The printable antimicrobial medium also includes a substrate layer having a first surface which may include a first area, a second surface opposite the first surface which includes a second area, and a first rigidity. The printable antimicrobial medium also includes a first adhesive deposited on the first area. The printable antimicrobial medium also includes a liner layer releasably secured to the substrate layer by the first adhesive and may and a first antimicrobial dry marking material including copper oxide deposited on at least a portion of the second area of the substrate layer, and a first score line arranged to separate the printable antimicrobial medium into a first portion and a second portion.

The printable antimicrobial medium may also include where the first antimicrobial dry marking material may include a toner. The copper oxide is present in an amount ranging from about 0.01% to about 5.00%, based on a total weight of the first antimicrobial dry marking material. The printable antimicrobial medium may include a second antimicrobial dry marking material deposited on at least a portion of the second area of the substrate layer. The substrate layer further may include paper.

An exemplary printable antimicrobial medium is disclosed. The printable antimicrobial medium also includes a substrate layer having a first surface which may include a first area, a second surface opposite the first surface which may include a second area, and a first rigidity. The printable antimicrobial medium also includes a first adhesive deposited on the first area. The printable antimicrobial medium also includes a liner layer releasably secured to the substrate layer by the first adhesive, and a first antimicrobial dry marking material deposited on at least a portion of the second area of the substrate layer, and a first score line arranged to separate the printable antimicrobial medium into a first portion and a second portion.

Implementations of the printable antimicrobial medium may include one or more markings on the substrate layer as a visual indication of a boundary delineating a first area of the printable antimicrobial medium from a second area of the printable antimicrobial medium. The substrate layer further may include paper.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

Figure 1:
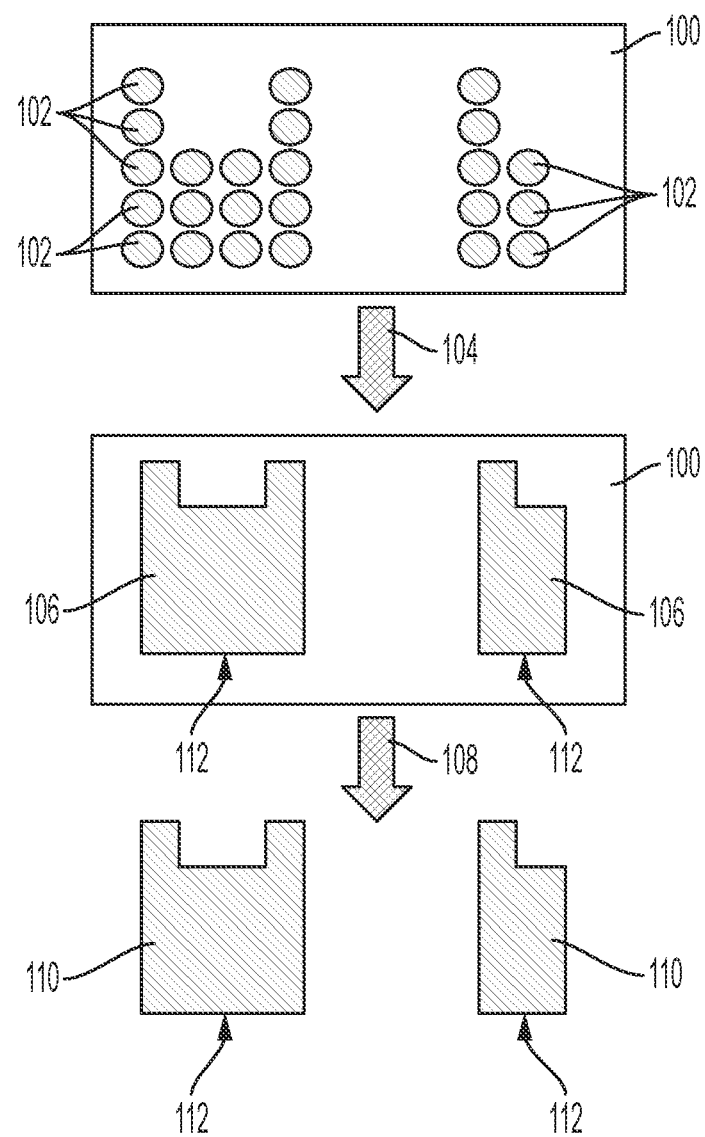
FIG. 1 is a schematic illustrating a process for producing a printable antimicrobial medium, according to an embodiment.

It should be noted that some details of the figures may have been simplified and are shown to facilitate understanding of the embodiments rather than to maintain strict structural accuracy, detail, and scale.

DESCRIPTION OF THE EMBODIMENTS

Reference will now be made in detail to embodiments of the present disclosure. The following description is merely exemplary.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be utilized and that changes may be made without departing from the scope of the present teachings. The following description is, therefore, merely illustrative.

Although embodiments of the disclosure herein are not limited in this regard, the terms "plurality" and "a plurality" as used herein may include, for example, "multiple" or "two or more." The terms "plurality" or "a plurality" may be used throughout the specification to describe two or more components, devices, elements, units, parameters, or the like. For example, "a plurality of resistors" may include two or more resistors.

As used herein, the modifier, "about," used in connection with a quantity is inclusive of the stated value and has the meaning dictated by the context (for example, it includes at least the degree of error associated with the measurement of the particular quantity). In embodiments, the terms of interest comprise a variation of less than about 10% from the stated value. When used in the context of a range, the modifier, "about," should also be considered as disclosing the range defined by the absolute values of the two endpoints. For example, the range "from about 2 to about 4" also discloses the range "from 2 to 4."

As used here, "metal acrylate(s)," such as, "silver acrylate(s)," is collective for acrylate monomers comprising at least one metal atom, such as, a silver atom, for use in polymers, such as, silver acrylate and silver methacrylate which are monomers for a polymer comprising silver.

The term, "antibacterial," as used herein refers to the property of a composition for inhibiting or destroying the growth of bacteria. In other words, a toner or toner component comprising antibacterial properties is effective in killing bacteria, or in inhibiting growth or propagation of bacteria, including as a printed image or structure.

The term, "antimicrobial," as used herein refers to an agent, or the property imparted by the agent, that kills or inhibits growth of microorganisms or microbes. An antibacterial agent, or property thereof, is an antimicrobial agent. Microorganisms include, for example, bacteria, fungi, algae, other single celled organisms, protists, nematodes, parasites, other multicellular organisms, other pathogens and so on. In other words, a toner or toner component comprising antimicrobial properties is effective in killing microbes, or in inhibiting growth and propagation of microbes, including as a printed image or structure. As "antibacterial" and "antimicrobial" are similar in terms of the effects the additives to disclosed toner compositions impart, they may, for the purposes of this disclosure to have similar meaning or intent of effect, in addition to similar terms, such as "antifungal," "biocidal," and the like.

The term, "nano," as used in, "copper oxide nanoparticles" or "silver nanoparticles," indicates a particle size of less than about 1000 nanometers (nm). In embodiments, the nanoparticles have a particle size of from about 0.5 nm to about 1000 nm, from about 1 nm to about 500 nm, from about 1 nm to about 100 nm, from about 1 nm to about 20 nm. The particle size is defined herein as the average diameter of the nanoparticles, as determined by TEM (transmission electron microscopy.) In embodiments, the composite nanoparticle has a volume average particle diameter (D50) of from about 10 to about 600 nanometers, or from about 10 to about 300 nanometers, or from about 10 to about 200 nanometers.

A polymer can be identified or named herein by the two or more of the constituent monomers used to construct the polymer, even though following polymerization, a monomer is altered and no longer is identical to the original reactant. Thus, for example, a polyester often is composed of a polyacid monomer or component and a polyalcohol monomer or component. Accordingly, if a trimellitic acid reactant is used to make a polyester polymer, that resulting polyester polymer can be identified herein as a trimellitic polyester. Also, a polymer can be composed of a styrene monomer and an acrylate monomer, and in that case, once polymerized, can be identified based on the monomers used. Hence, if the acrylate is butyl acrylate, the resulting polymer can be called a styrene polymer, a butyl acrylate polymer, a styrene/acrylate polymer and so on.

The terms "substrate," "medium substrate," "print substrate," and "print medium" generally refer to a usually flexible physical sheet of paper, polymer, Mylar® material, plastic, or other suitable physical print medium substrate, fabric, sheets, webs, etc., for images, whether precut or web fed.

The term "printing device" or "printing system" as used herein refers to a digital copier or printer, scanner, image printing machine, xerographic device, electrostatographic device, digital production press, document processing system, image reproduction machine, bookmaking machine, facsimile machine, multi-function machine, or generally an apparatus useful in performing a print process or the like and can include several marking engines, feed mechanism, scanning assembly as well as other print medium processing units, such as paper feeders, finishers, and the like. A "printing device" may print upon a surface in a manner that may be raised above the top surface of a substrate and further described as 2-dimensional (2D), 2.5-dimensional (2.5D), or 3-dimensional (3D), resulting in textured, structured, or raised print surfaces as printed by a "printing device." A "printing system" may handle sheets, webs, substrates, and the like. A printing system can place marks on any surface, and is any machine that reads marks on input sheets, or any combination of such machines.

All physical properties that are defined hereinafter are measured at 20° C. to 25° C. unless otherwise specified. The term "room temperature" refers to a temperature ranging from about 20° C. to about 25° C., such as about 22° C., unless otherwise specified.

Exemplary examples of a printable antimicrobial medium according to the present disclosure include a substrate layer with a first surface having a first area, a second surface opposite the first surface having a second area, and a first rigidity, capable of supporting the entire structure of the printable antimicrobial medium. The antimicrobial medium further includes a first adhesive deposited on the first area of the substrate, a liner layer releasably secured to the substrate layer by the first adhesive, and a first antimicrobial dry marking material deposited on at least a portion of the second area of the substrate layer. Illustrative examples of the present disclosure also include printable antimicrobial medium which has a substrate layer with a first surface having a first area, a second surface opposite the first surface having a second area, and a first rigidity, capable of supporting the entire structure of the printable antimicrobial medium. The antimicrobial medium further includes an adhesive deposited on the first area of the substrate, a liner layer releasably secured to the substrate layer by the first adhesive also having a first score line arranged to separate the liner layer or the entire printable antimicrobial medium into a first portion and a second portion. A first antimicrobial dry marking material comprising copper oxide is deposited on at least a portion of the second area of the substrate layer.

The printable medium as described herein can be applied or fabricated within a variety of printing applications to produce laminated or adherable antibacterial images or patches that may be applied to high-touch contact areas. The toner compositions or configurations of the medium layers can be designed and optimized to be compatible with the alternate medium substrates, image processing steps, a wide range of antibacterial or antimicrobial additives, or combinations thereof to print and create antibacterial surfaces in a facile manner.

Based on the growing need for high performing products, especially when related to health and hygiene, the present printable medium with antibacterial or antimicrobial properties fill a market need and provide consumers with a robust, effective, and lasting antibacterial or antimicrobial protection on any surface to which a printable adhering label may be affixed. Some key environments that can benefit from applications using the printable antimicrobial medium compositions include hospitals, daycare centers, care homes, schools, dental offices, doctor offices, hospitals (e.g., charts memos, pictures), other types of medical offices, veterinary practices, law offices and courts (e.g., legal documents), kitchens, and restaurants (e.g., menus). The present printable antimicrobial medium, having images, or surfaces printed therewith render any product or high-touch surface more hygienic, helping the product or surface maintain a fresh appearance by reducing or avoiding altogether odor causing or staining microbes and also avoid degradation of any important identification tag, label, or drug identification number (DIN) by the microbes themselves. In embodiments, the printable antimicrobial medium compositions include a copper oxide containing pigment. Copper oxide exhibits antimicrobial activity against a broad range of micro-organisms. Copper oxide is considered an ideal anti-microbial agent because it has a high effectiveness against a wide range of relevant microbes within a wide range of humidity levels and temperatures.

The printable antimicrobial medium and exemplary embodiments disclosed herein can be used for any suitable or desired application. The printable antimicrobial medium is particularly suitable for applications having the goal of producing customizable, digitized antibacterial printed images, text, surface coatings, etc. Examples of applications include printing codes, labels, or logos on medical devices such as catheters, thermometers, and other medical devices, printing on menus, food packaging materials, cosmetic tools and products, etc.

In certain embodiments, the present printable antimicrobial medium compositions and exemplary embodiments disclosed herein may enable surfaces or objects to remain clean from microbes by directly printing or adhering such a printed label or film with antimicrobial agents onto high-touch surfaces. Hospitals and medical clinics are some areas needing an extra layer of antimicrobial protection but these coatings can extend to any high traffic area and objects such as handles, public seating on buses, trains and airports, check-in kiosks, toilets, counters, push carts/trolleys, elevator buttons and escalator railings. Medical implant surfaces are another concerning issue of persistent microbial contamination that is prevalent in peri- (during surgery) and post-operative patients who suffer from microbial proliferation at the implant-tissue interface causing deadly biofilm associated infections. Other applications include digitally printed ID codes, short-run printable materials, printing or affixing such printable antimicrobial medium on three-dimensional medical components such as catheters, cardiac stents, programmable pacemakers, and any other desired substrate.

The sources of microorganisms can be bacterial, viral, or fungal. Microorganism contamination can come from typical handling of objects and papers, etc., from airborne microbes via sneezing and coughing, and other manner of spreading of infection from contaminated persons or contact with contaminated objects. Contact of these microbes with the present printable antimicrobial medium compositions, including contact with a printed image or text prepared with the present printable antimicrobial medium compositions and exemplary embodiments disclosed herein, will inhibit the microbial growth and, in embodiments, destroy any possible colonization at the site of contact.

FIG. 1 is a schematic illustrating a process for producing a printable antimicrobial medium, according to an embodiment. FIG. 1 shows a substrate layer 100 for a printable antimicrobial medium, shown with several particles of a first antimicrobial dry marking material 102, in this instance several antimicrobial toner particles, deposited on at least a portion of an area of the substrate layer 100. The first antimicrobial dry marking material 102 is temporarily adhered to an area of the substrate layer 100. The substrate layer 100 along with any other layers and the antimicrobial dry marking material 102 are then processed through a fusing process step 104, which renders the antimicrobial dry marking material 102 into a permanent image on the surface of the substrate layer 100. Once the substrate layer 100 passes through the fusing process step 104, the antimicrobial dry marking material 102 is transformed with the use of heat, pressure, or both, into a fused image 106 in a specific or custom shape. This shape may be variably determined depending on a final use of the printable antimicrobial medium. Once fused, the fused image 106 is subjected to a cutting process step 108, which removes an area of the substrate layer 100 that may not have an appreciable amount of antimicrobial dry marking material 102 on the surface of the substrate layer 100 which is transformed into a fused image 106 by the fusing process step 104. The cutting process step may result in the fused image 106 having one or more score lines 112 on one or more edges of the fused image 106 defining the desired image area for the printable antimicrobial medium 110. The score lines separate the liner layer into a first portion and a second portion and may be automatically or manually introduced into the substrate layer 110 and may be cut through one or more additional layers below the substrate layer 100, depending on the configuration of the printable antimicrobial medium 110. The cutting or scoring steps may be completed with the printed antibacterial medium in a single printing system, or in a separate post-process step having a finishing or cutting station to complete the cutting or scoring. The cut lines or score lines may also be pre-printed or pre deposited markings on the substrate layer useful as a visual indication of a boundary delineating a first area of the printable antimicrobial medium from a second area of the printable antimicrobial medium. An adhesive liner layer may have a first score line 112 arranged to separate the liner layer into a first portion and a second portion. For example, in certain embodiments including, but not limited to the embodiment described in regard to FIG. 2, the one or more score lines 112 may travel through one of the layers or all layers to potentially include the fused image 106, the substrate layer 100, an adhesive layer, an adhesive liner layer, as well as any additional layers used in the antimicrobial medium according to one or more embodiments according to the present disclosure. The retained portion results in one or more antimicrobial medium 110 fabricated to a specific or custom shape using the process as described herein. The deposited antimicrobial dry marking material 102 and therefore also the fused image 106 on at least a portion of the substrate layer includes a variable image content, such as a label, barcode, solid patch, or a combination thereof. The deposited antimicrobial dry marking material 102 and therefore also the fused image 106 may include more than one pattern or include one or more colorants or one or more antimicrobial additives or pigments included in the antimicrobial dry marking material 102. The printable antimicrobial medium 110 shown in FIG. 1 has a paper substrate although alternate embodiments may include substrates that may include natural fiber substrates, plastic substrates, vinyl-based materials, and the like. Alternative examples of suitable substrates may include metal foils, such as aluminum foil, steel foil, nickel foil, metalized paper, metallized plastics, and the like. While the antimicrobial medium illustrated herein includes a dry marking material as the antibacterial or antimicrobial component, it alternatively may be a dry ink, liquid ink, or phase change ink in certain embodiments.

Figure 2:
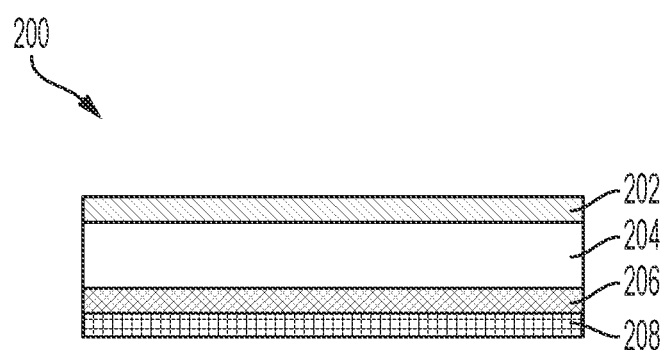
FIG. 2 is a cross-sectional schematic illustrating a printable antimicrobial medium, according to an embodiment.

FIG. 2 is a cross-sectional schematic illustrating a printable antimicrobial medium, according to an embodiment. An exemplary printable antimicrobial medium 200 is shown in cross-section in FIG. 2. The printable antimicrobial medium 200 has a top layer including a layer of an antimicrobial dry marking material 202 deposited onto a substrate layer 204. The substrate layer 204 has a first surface with a first area facing an adhesive layer 206 and a second surface opposite the first surface comprising a second area facing the top antimicrobial marking material layer 202. The substrate layer 204 has a rigidity necessary to support the overall printable antimicrobial medium 200 and any additional layers therein. The adhesive layer 206 is deposited on the first area of the substrate layer 204. Releasably affixed to the adhesive layer 206 is a liner layer 208. The liner layer 208 is releasably secured to the substrate layer 204 by the first adhesive 206 and may include one or more score lines as described in regard to FIG. 1, arranged to separate the liner layer 208 into a first portion and a second portion, one of which includes the printable antimicrobial medium portion of interest, and one that may or may not be a background portion or support portion. The antimicrobial dry marking material 202 includes copper oxide deposited on at least a portion of the second area of the substrate layer 204. The copper oxide may alternatively be compounded into a dry ink composition, such as a toner. In embodiments, the first antimicrobial dry marking material may be a toner in certain embodiments. There may be an antimicrobial additive added to the printable antimicrobial medium where the antimicrobial additive is applied and adhered either directly to the substrate, or as a component of the first antimicrobial dry marking material. The antimicrobial additive is present in an amount ranging from about 0.01% to about 5.00%, based on a total weight of the antimicrobial dry marking material. Illustrative examples of an antimicrobial additive include copper-based compositions, including, but not limited to copper oxide. The copper, copper oxide, or other copper-based antimicrobial additive may include copper nanoparticles. Alternatively, the antimicrobial additive may include silver nanoparticles, silver salts, or mixtures thereof. In exemplary examples, a second antimicrobial dry marking material 202 may be deposited on at least a portion of the second area of the substrate layer 204. This provides the antimicrobial medium with an image, label or other custom design having a variety of colors, patterns, broader effects of antimicrobial, antibacterial, antifungal activity, or a combination thereof.

The printing or depositing and fusing steps to produce the printable antimicrobial medium may be accomplished using a typical electrostatic reproducing apparatus. A typical electrostatic reproducing apparatus begins with a light image of an original to be copied recorded in the form of an electrostatic latent image upon a photosensitive member. Next, the latent image is subsequently rendered visible by the application of electroscopic thermoplastic resin particles which are commonly referred to as toner. Specifically, a photoreceptor is charged on its surface by a charging device to which a voltage is supplied from a power supply. The photoreceptor is then imagewise exposed to light from an optical system or an image input apparatus, such as a laser and light emitting diode, to form an electrostatic latent image on the photoreceptor. The photoreceptor can be a drum or belt. Alternatively, the image may be digitally produced and transferred electronically to the printer. Generally, the electrostatic latent image is developed by bringing a developer mixture from a developer station into contact herewith. Development can be influenced by use of a magnetic brush, powder cloud, or other known development process. A dry developer mixture usually includes carrier granules having toner particles adhering triboelectrically thereto. Toner particles are attracted from the carrier granules to the latent image, forming a toner powder image. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface, in image configuration, they are transferred to a copy sheet by a transfer apparatus, which can be performed by pressure transfer or electrostatic transfer. Alternatively, the developed image can be transferred to an intermediate transfer member, or bias transfer member, and subsequently transferred to a copy sheet. Examples of copy or medium substrates include paper, transparency material such as polyester, polycarbonate, or the like, cloth, wood, or any other desired material upon which the finished image will be situated.

After the transfer of the developed image is completed, the copy sheet may advance to a fusing station as a fuser roll and a pressure roll (although any other fusing member components such as fuser belt in contact with a pressure roll, fuser roll in contact with pressure belt, and the like, are suitable for use with the present apparatus), where the developed image is fused to the copy sheet by passing the copy sheet between the fusing and pressure members, thereby forming a permanent image. Alternatively, transfer and fusing can be affected by a transfix application. The photoreceptor, subsequent to transfer, advances to a cleaning station, where any toner left on the photoreceptor is cleaned therefrom by use of a blade, brush, or other cleaning apparatus. Alternatively, transfer and fusing can be affected by a transfix application. Similar processes may be used to produce the printable antimicrobial medium as described herein.

Color printers commonly use one to four, or more housings carrying different colors to generate full color images based on black plus the standard printing colors, cyan, magenta and yellow. However, in embodiments, additional housings may be desirable, including image generating devices possessing five housings, six housings or more, thereby providing the ability to carry additional toner colors to print an extended range of colors (extended gamut) and to provide a clear coat or coating. It should be noted that the addition of antibacterial pigment additives may impart color and therefore shift standard color gamut in comparison to standard color toner formulations.

In embodiments are provided a printable antimicrobial medium structure for applying an antibacterial printed image onto a surface. In embodiments the surface is 2-D (e.g., paper or a label) or 3-D (medical device, such as, a catheter or thermometer). In embodiments, the antibacterial printed image may be a clear coat formed with a near clear toner, or near colorless toner having a lower amount of an antibacterial pigment composition and applied over a surface to provide an antimicrobial coating on the surface of a printed substrate or label. The clear coat may be applied over an earlier printed or flat image or may be applied as a coating to a 3-dimensional surface, such as, a medical instrument. In embodiments, the antimicrobial printed image is formed with a color toner to provide an antimicrobial image, such as, a label or UPC code. The color antimicrobial printed image on the medium may be a printed code, a printed text, or a printed logo.

The toner may be applied to a surface by fusing at a temperature that adheres the toner to the surface, but does not diminish or destroy the antimicrobial properties of the toner. In embodiments, the toner is fused at a temperature from about 80° C. to about 130° C., less than about 125° C., less than about 120° C. less than about 115° C., or lower.

In embodiments, the dry antimicrobial marking material used for the printable antimicrobial medium is one which is amenable to fusing without elevated temperatures, a cold fusing process, that can rely on pressure alone, for example, to fuse toner to a surface or to a substrate.

The printable antimicrobial medium described herein is applied by an image forming apparatus. The antibacterial toner used in at least one embodiment of the printable antimicrobial medium includes a binder resin, a charge control additive incorporated into the binder resin, one or more additives incorporated onto a surface of the binder resin, a wax, and one or more antibacterial pigments. An exemplary example of an antibacterial pigment may include a pigment comprising copper oxide.

In embodiments, the binder resin is a polystyrene/acrylate resin. In other embodiments, the copper oxide is a spherical particle, and may have a particle size from about 0.1 microns to about 20 microns. The antibacterial pigment may be present in the antimicrobial toner particle composition from about 0.2% to about 5.0% based on a total weight of the antimicrobial toner particle composition. The antibacterial pigment may include silver nanoparticles in certain embodiments wherein a ratio of copper oxide to silver nanoparticles is from about 1:1 to about 10:1. Exemplary examples of antibacterial toner compositions of the present disclosure may include quaternary ammonium compounds, such as benzalkonium chloride, methylbenzethonium chloride, tetraethylammonium bromide, or a combination thereof, and present in the antimicrobial toner particle composition from about 0.01% to about 10.0% based on a total weight of the antimicrobial toner particle composition. Other examples of toner composition constituents and other toner compositions and their respective components are known to those skilled in the art, and may be found in co-pending application Ser. No. 17/454,198, entitled ANTIMICROBIAL TONER PARTICLES, which is incorporated herein in its entirety.

In addition to known toner components useful in producing the antimicrobial printable medium as disclose herein include metal-containing pigments or additives known for their use in antimicrobial, antifungal, antibacterial, or combinations thereof. It is known by those skilled in the art that copper and silver possess antimicrobial properties and share what is referred to as the oligodynamic effect, which is a biocidal effect of metals. Such metals release ions which covalently bond to proteins and therefore disrupt the ability of these cells to function or replicate. An additional mechanism known in copper and copper compounds in their action against microbes is the release of an electron in certain forms, which created a reactive oxygen species and can be highly destructive to viruses, bacteria, fungi, and the like. Copper and copper compounds are also non-toxic to humans and less problematic in the environment. Copper and its compounds are also effective under a broader set of conditions than some other antibacterial elements or compounds. Under certain lower temperature conditions, the efficacy of silver may be reduced. By contrast, copper maintains its efficacy across a range of temperatures and humidity.

In some embodiments, an antibacterial pigment may include metals other than copper. Examples of the metal pigment disclosed herein may include a metal powder of silver, aluminum, brass, bronze, nickel, zinc, and the like. The content of the metal pigment in the antibacterial toner may be from 1 part by weight to 70 parts by weight of the binder resin and in embodiments from 5 parts by weight to 50 parts by weight with respect to 100 parts by weight of the binder resin described herein. Exemplary examples of copper oxide pigment include spherical copper oxide particles ranging from about 0.1 to about 10 microns in size.

Any suitable or desired metal can be selected for embodiments herein provided that the metal imparts the desired anti-bacterial effect, antifungal effect, antiviral biocide effect, or combination thereof. While other metals can be used, only certain ones will have anti-bacterial properties. In embodiments, Co, Ag, Ni, Au and Pd can be used in a copper-based composite, wherein the Co, Ag, Ni, Au, Pd, or mixture or combination thereof can impart anti-bacterial and/or anti-microbial properties. In embodiments, Ag and Cu are selected. In other embodiments, composites including Pt, Al, Cr, In, and mixtures and combinations thereof, can be selected.

In embodiments, the copper nanoparticles may comprise solely elemental copper or may be a copper composite or alloy, including composites or alloys with other metals. Such metal-copper composite may include one or more other metals. Suitable other metals include for example Al, Au, Pt, Pd, Ag, Co, Cr, In, and Ni, particularly the transition metals for example Au, Pt, Pd, Ag, Cr, Ni, and mixtures thereof. Exemplary metal composites are Au—Cu, Ag—Cu, Au—Ag—Cu, and Au—Cu—Pd. The various components of the copper composite may be present in an amount ranging, for example, from about 0.01% to about 99.9% by weight, particularly from about 10% to about 90% by weight. In embodiments, the copper composite is a metal alloy composed of copper and one, two or more other metals, with copper comprising for example at least about 20% of the nanoparticles by weight, particularly greater than about 50% of the nanoparticles by weight. Unless otherwise noted, the weight percentages recited herein for the components of the copper-containing nanoparticles do not include stabilizer. Those skilled in the art will appreciate that metals other than copper may be useful and can be prepared or combined with antimicrobial toner compositions in accordance with the disclosure herein.

In some embodiments, antimicrobial toner compositions as disclosed herein may include quaternary ammonium compounds (QACs). Quaternary ammonium compounds (QACs) are sometimes also referred to as quats, and may be useful as biocides in several applications such as wound dressings, lotions, cleansers, and those as described herein. These compounds are cationic surfactants, or positively charged surface-active agents, that impact cell walls and membranes after relatively long contact times. The permanent positive charge of QACs makes them bind readily to the negatively charged surface of most microbes. QACs are generally very stable, mostly unaffected by pH levels, and remain effective on surfaces for prolonged periods of time. The antimicrobial activity QACs may be more selective than that of other disinfectants, however, they are generally very effective against bacterial biofilms. Examples of QACs include benzalkonium chloride, benzethonium chloride, methylbenzethonium chloride, cetalkonium chloride, cetylpyridinium chloride, cetrimonium, cetrimide, dofanium chloride, tetraethylammonium bromide, didecyldimethylammonium chloride, domiphen bromide, and others known in the art.

Typical loadings of the antibacterial, antimicrobial, or biocide additives may range anywhere from about 0.01% to about 30% by weight of the total weight of the antimicrobial toner compositions, or from about 0.1% to about 2.0%, or from about 1% to about 10% by weight of the total weight of the antimicrobial toner compositions. The quaternary ammonium compounds (QACs) may be incorporated into the binder resin, one of the surface additives, the wax, or any combination thereof.

Any suitable substrate, recording sheet, medium, or removable support, stage, platform, and the like, may be employed for depositing the toner compositions thereon, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Gloss, Sappi Warren Papers LUSTROGLOSS®, and the like. Additional substrate materials that may be suitable include plastic substrates such as Mylar®, vinyl-based materials, and the like, as well as metal foils such as aluminum foil, steel foil, nickel foil, metalized paper, metallized plastics, polyester, synthetic paper such as Teslin®, and ID card materials such as PVC, PET, and composites thereof.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A printable antimicrobial medium, comprising:
   a substrate layer comprising a first surface comprising a first area, and a second surface opposite the first surface comprising a second area;
   a first adhesive deposited on the first area;
   a liner layer releasably secured to the substrate layer by the first adhesive; and
   an image formed from a first antimicrobial dry marking material comprising a binder resin, the binder resin comprising a pigment comprising copper oxide and silver nanoparticles deposited on at least a portion of the second area of the substrate layer; and
   wherein a ratio of copper oxide to silver nanoparticles is from about 1:1 to about 10:1.

2. The printable antimicrobial medium of claim 1, wherein the first antimicrobial dry marking material comprises a toner.

3. The printable antimicrobial medium of claim 1, further comprising an antimicrobial additive.

4. The printable antimicrobial medium of claim 3, wherein the antimicrobial additive is present in an amount ranging from about 0.01% to about 5.00%, based on a total weight of the first antimicrobial dry marking material.

5. The printable antimicrobial medium of claim 1, wherein the first antimicrobial dry marking material further comprises copper nanoparticles.

6. The printable antimicrobial medium of claim 1, wherein the first antimicrobial dry marking material further comprises silver salts, or mixtures thereof.

7. The printable antimicrobial medium of claim 1, wherein the first antimicrobial dry marking material deposited on at least a portion of the second area of the substrate layer comprises a variable image content.

8. The printable antimicrobial medium of claim 1, wherein the substrate layer further comprises paper.

9. The printable antimicrobial medium of claim 1, wherein the substrate layer further comprises plastic.

10. The printable antimicrobial medium of claim 1, wherein the liner layer further comprises a first score line arranged to separate the liner layer into a first portion and a second portion.

11. The printable antimicrobial medium of claim 1, wherein the printable antimicrobial medium further comprises a second score line arranged to separate the printable antimicrobial medium into a first portion and a second portion.

12. A printable antimicrobial medium, comprising:
a substrate layer comprising a first surface comprising a first area, a second surface opposite the first surface comprising a second area;
a first adhesive deposited on the first area;
a liner layer releasably secured to the substrate layer by the first adhesive;
a first antimicrobial dry marking material comprising a binder resin, the binder resin comprising a pigment comprising copper oxide and silver nanoparticles deposited on at least a portion of the second area of the substrate layer; and
a first score line arranged to separate the printable antimicrobial medium into a first portion and a second portion; and
wherein a ratio of copper oxide to silver nanoparticles is from about 1:1 to about 10:1.

13. The printable antimicrobial medium of claim 12, wherein the first antimicrobial dry marking material comprises a toner.

14. The printable antimicrobial medium of claim 12, wherein the copper oxide is present in an amount ranging from about 0.01% to about 5.00%, based on a total weight of the first antimicrobial dry marking material.

15. The printable antimicrobial medium of claim 12, further comprising a second antimicrobial dry marking material deposited on at least a portion of the second area of the substrate layer.

16. The printable antimicrobial medium of claim 12, wherein the substrate layer further comprises paper.

17. A printable antimicrobial medium, comprising:
a substrate layer comprising a first surface comprising a first area, a second surface opposite the first surface comprising a second area;
a first adhesive deposited on the first area;
a liner layer releasably secured to the substrate layer by the first adhesive;
a first score line arranged to separate the printable antimicrobial medium into a first portion and a second portion; and
an image formed from a first antimicrobial dry marking material comprising a binder resin, the binder resin comprising a pigment comprising copper oxide and silver nanoparticles deposited on at least a portion of the second area of the substrate layer; and
wherein a ratio of copper oxide to silver nanoparticles is from about 1:1 to about 10:1.

18. The printable antimicrobial medium of claim 17, further comprising one or more markings on the substrate layer as a visual indication of a boundary delineating a first area of the printable antimicrobial medium from a second area of the printable antimicrobial medium.

19. The printable antimicrobial medium of claim 17, wherein the substrate layer further comprises paper.

* * * * *